Jan. 29, 1929.
G. B. LOMER
1,700,204
DIFFERENTIAL PRESSURE GAUGE AND FLOW METER
Filed Jan. 30, 1923    6 Sheets-Sheet 1
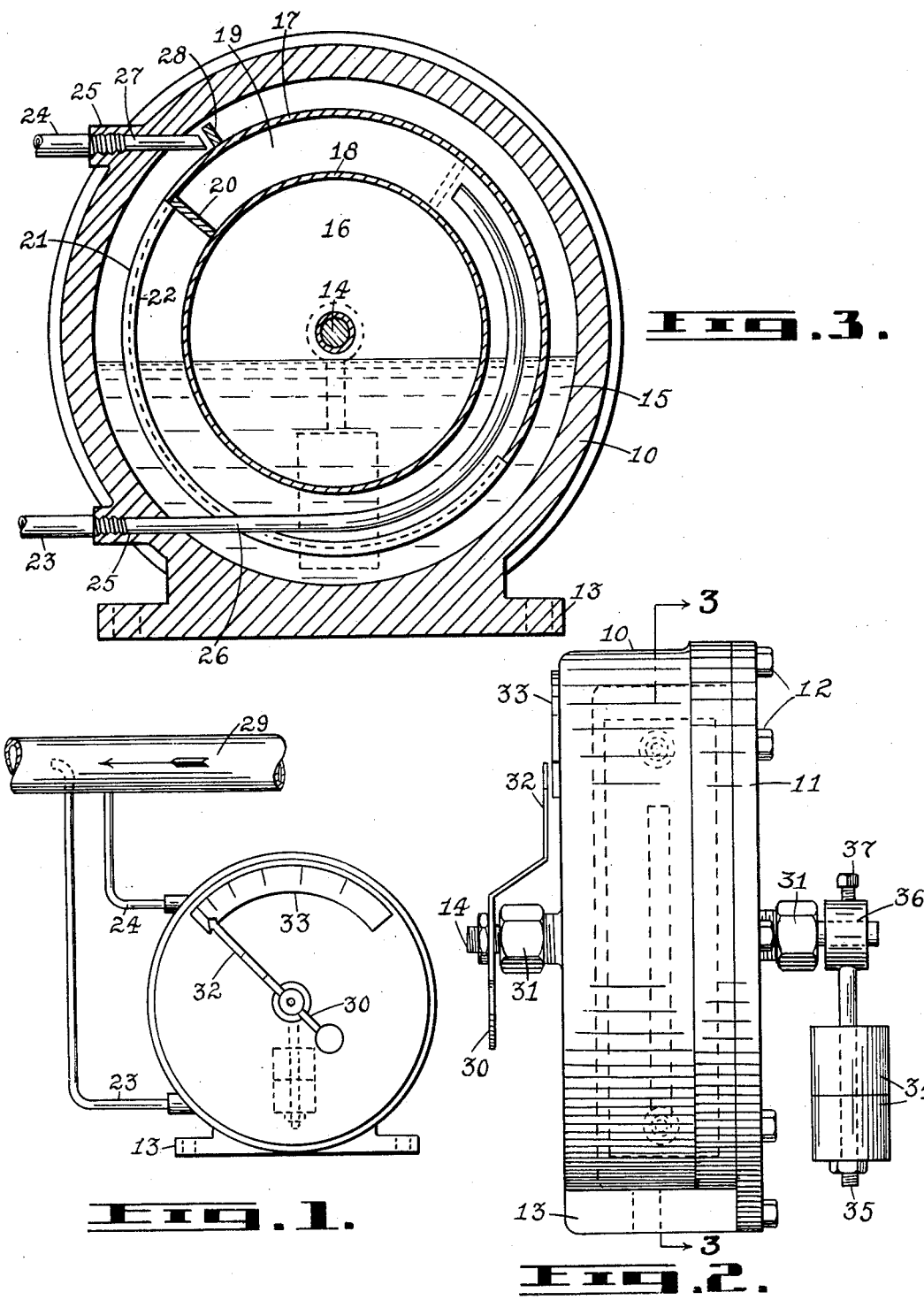
INVENTOR
GERALD B. LOMER
BY
William S. Fowler
ATTORNEY Jan. 29, 1929.  G. B. LOMER  1,700,204
DIFFERENTIAL PRESSURE GAUGE AND FLOW METER
Filed Jan. 30, 1923    6 Sheets-Sheet 2

INVENTOR
GERALD B. LOMER
BY
William S. Fowler
ATTORNEY

Jan. 29, 1929.

G. B. LOMER 1,700,204

DIFFERENTIAL PRESSURE GAUGE AND FLOW METER

Filed Jan. 30, 1923  6 Sheets-Sheet 3

INVENTOR
GERALD B. LOMER
BY
William S. Fowler
ATTORNEY

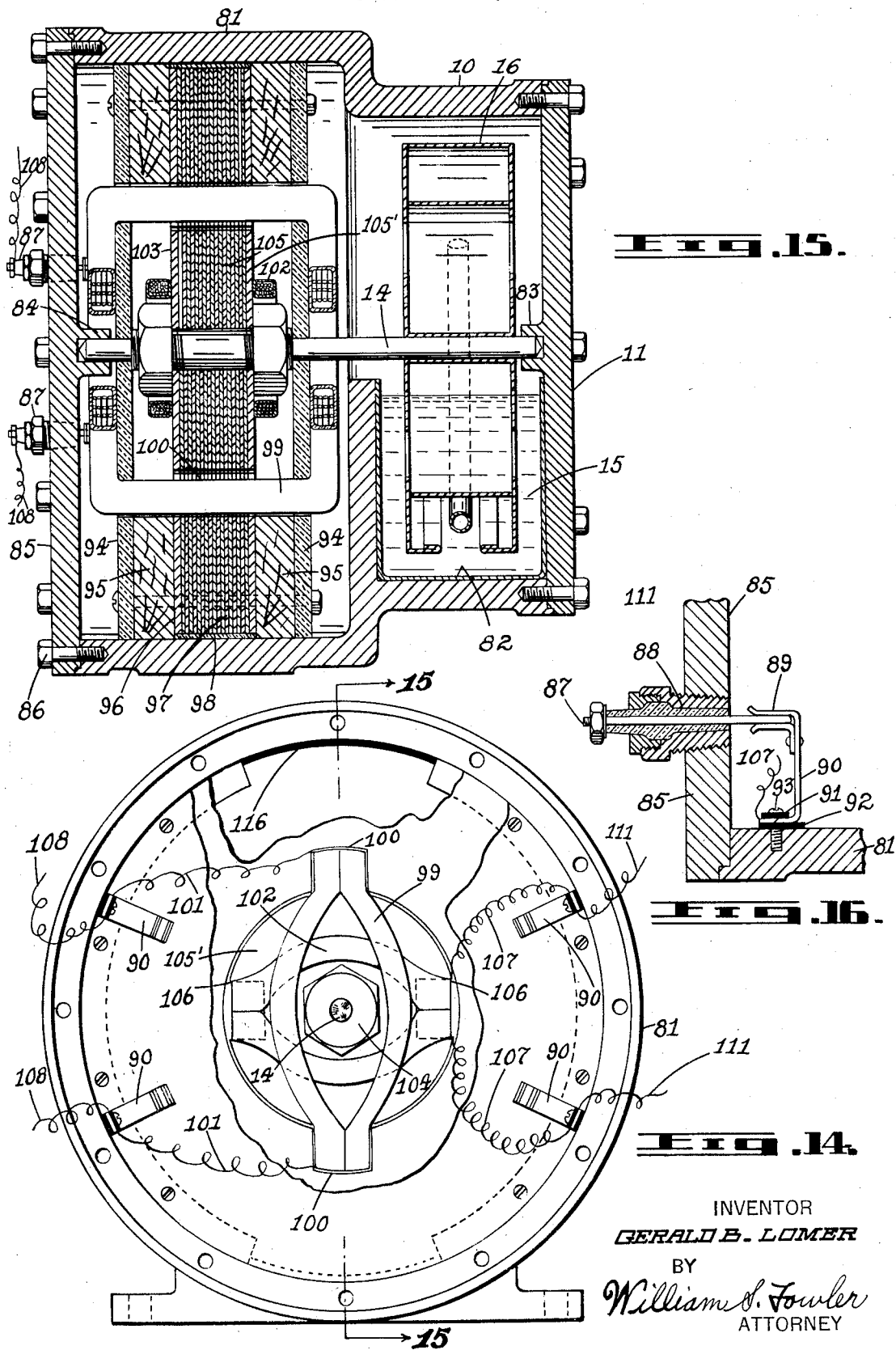

Jan. 29, 1929.  
G. B. LOMER  
1,700,204  
DIFFERENTIAL PRESSURE GAUGE AND FLOW METER  
Filed Jan. 30, 1923  6 Sheets-Sheet 5

INVENTOR  
GERALD B. LOMER  
BY  
William S. Fowler  
ATTORNEY

Jan. 29, 1929.  1,700,204
G. B. LOMER
DIFFERENTIAL PRESSURE GAUGE AND FLOW METER
Filed Jan. 30, 1923   6 Sheets-Sheet 6

INVENTOR
GERALD B. LOMER
BY
William S. Fowler
ATTORNEY

Patented Jan. 29, 1929.

1,700,204

UNITED STATES PATENT OFFICE.

GERALD B. LOMER, OF OTTAWA, ONTARIO, CANADA.

DIFFERENTIAL PRESSURE GAUGE AND FLOW METER.

Application filed January 30, 1923. Serial No. 615,839.

This invention has relation to certain new and useful improvements in gauges and flow meters and has for its primary object the provision of a type of gauge which may be also converted into a flow meter without materially altering the construction and operation of the principal parts thereof.

Another object of the invention resides in the provision of a type of gauge and flow meter which may be employed for the various purposes for which such devices are adapted, to give an accurate and constant reading of the pressure or flow of the liquids, steam or the like in the system or part of the system to which the gauge or flow meter is connected.

Another object of the invention resides in the provision of a gauge or flow meter which will disclose the suction, the pressure or the differential pressure, according to the specific arrangement of the parts of the gauge or flow meter and the connection and application of the same to the system such as a steam service system.

A further object of the invention resides in the provision of a gauge or flow meter of the character stated including a drum having always the same amount of material submerged in the heavier liquid with respect to the right and left sides of the horizontal shaft.

The invention has for a further object the provision of a gauge or flow meter of the character stated in which the rotatable drum is formed in such a manner that equal horizontal increments of displacement within the sealed portion of the same exert equal increments of turning force about the axis of the rotatable drum, which condition is not upset by incorrect balancing or displacement of the heavier liquid.

A further object resides in the provision of a gauge or flow meter of the character stated in which the rotatable drum continues to move until suction or pressure (differential pressure) within it is balanced by a force entirely independent of displacement of the drum itself.

A further object resides in the provision of a gauge or flow meter of the character set forth whereby the rotatable drum will be rotated by a force transmitted tangentially with respect to the horizontal shaft carrying the rotatable drum, change of level due to evaporation or temperature variation making no difference.

A further object of the invention resides in the provision of a gauge or flow meter for registering differential pressure and including a rotatable drum mounted on a horizontal shaft for rotation in a liquid chamber in such a manner that no tangential force is exerted on the rotatable drum due to change of displacement caused by the rotation of the drum in the liquid chamber.

The invention has for a further object the provision of a gauge or flow meter of the type stated, including a rotary bell having one or more chambers and mounted for operation in a liquid chamber in such a manner that the drum is always balanced in the liquid of the liquid chamber, thereby preventing the exertion of tangential force on the drum when rotated due to change of displacement of the liquid by the rotation of the drum therein.

A still further object of the invention resides in the provision of a gauge or flow meter of the character stated in which the scale graduations may be equalized by proper positioning of weights and counter-weights, the weights being preferably in the form of a member suspended over a pulley on the drum shaft (or a spring connected with the shaft) while the counter-balancing weight is extended normally in horizontal plane from the shaft.

The invention has for a still further object the provision of a gauge or flow meter of the character stated constructed in such a manner that the mechanical force operating upon the rotatable drum will be balanced by electrically controlled mechanism such as a transformer with a movable secondary coil in which a current is induced as the drum rotates, induced current being a measure of the mechanical force and differential pressure causing it.

A still further object of the invention resides in the provision of a gauge or flow meter of the character stated in which the mechanical force operating the rotatable drum is balanced by electrically controlled mechanism carried on the same shaft as the rotatable drum and including a transformer with a movable secondary coil in which a current is induced on rotation of the drum, the voltage variations of the primary circuit of the transformer being compensated for by use of a watt meter as recording means, with primary potential and secondary current windings, whereby an unsteady or variable line voltage causes no error in the meter.

A still further object resides in the provision of means for recording electrically any mechanical force or differential pressure determined by any gauge meter or other measuring device.

The invention has for a still further object the provision of a gauge or flow meter of the character stated including counter-balancing means in the form of an annular chamber carried concentrically on the main shaft on which the pressure operated member is concentrically arranged a balancing liquid being carried in the annular chamber to normally retain the main shaft in one position and offer resistance to operation of the pressure operated member.

A still further object resides in the provision of a gauge or flow meter of the character set forth in which the registering mechanism is operated from the main shaft by magnetic attraction according to the rotation of the main shaft as a result of operation of the pressure operated member carried thereon while the counter-balancing means is arranged for operation on the registering mechanism to counter-balance the same and retard operation thereof in resistance to operation of the pressure operated member and the main shaft on which the latter is carried.

With the foregoing and other objects in view as will appear as the description proceeds the invention consists in the novel construction, combination and arrangement of co-operating elements as hereinafter more specifically set forth, claimed and shown in the accompanying drawings forming a part of the present application, in which:

Fig. 1 is a front elevation of the device arranged to serve as a suction gauge or flow meter.

Fig. 2 is an enlarged side elevation of the device, taken at right angles to Fig. 1.

Fig. 3 is a vertical section through the device, substantially on the plane of line 3—3 of Fig. 2, looking in the direction indicated by the arrows.

Figure 4:
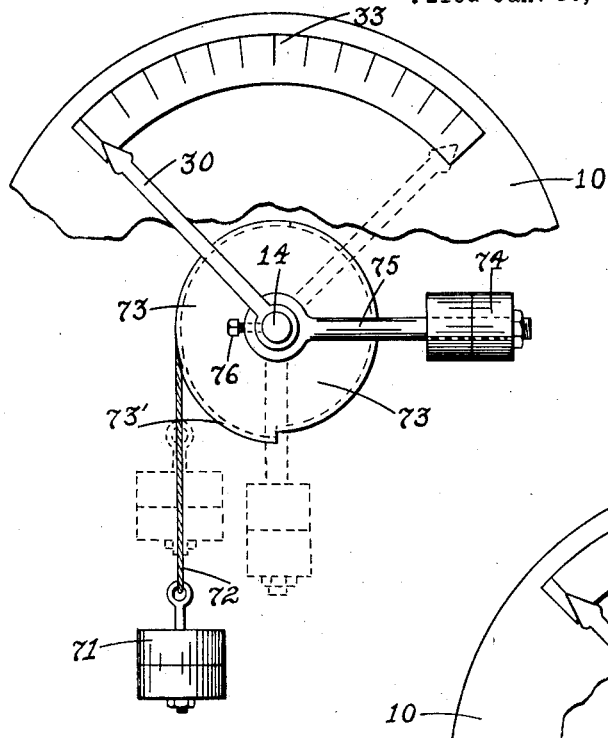
Fig. 4 is a front elevation, showing a modified form of counter-balancing means, part of the casing and its contents being broken away for the sake of clearness.
Figure 5:
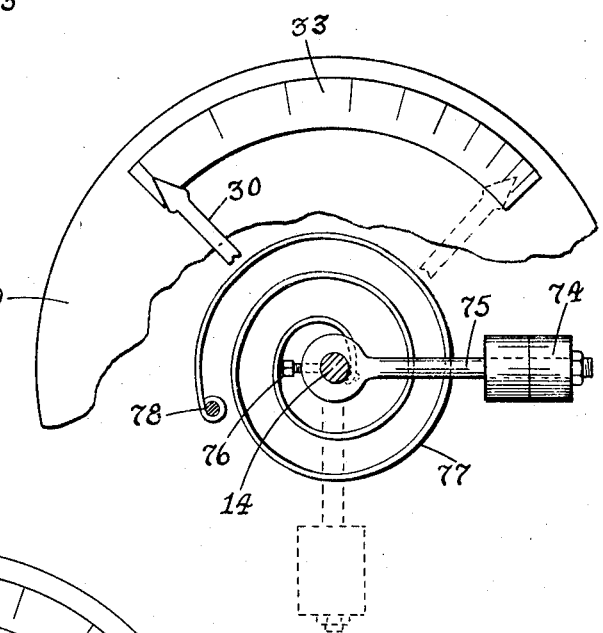
Fig. 5 is a view similar to Fig. 4, showing a further modification of counter-balancing means.
Figure 5A:
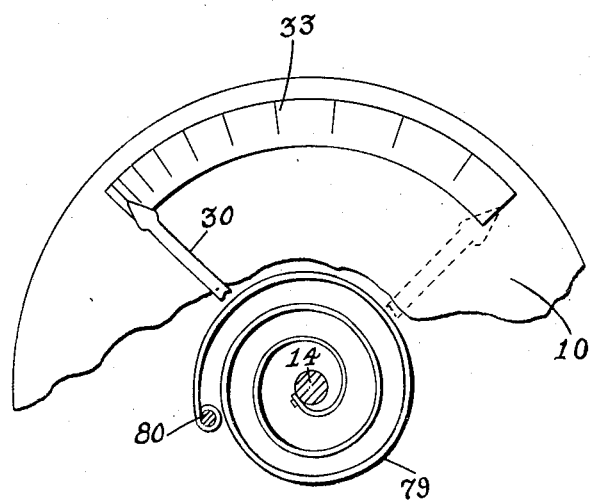

Fig. 5ᴀ is a view similar to Figs. 4 and 5 and disclosing a spring counter-balance.

Figures 6, 8, 10:
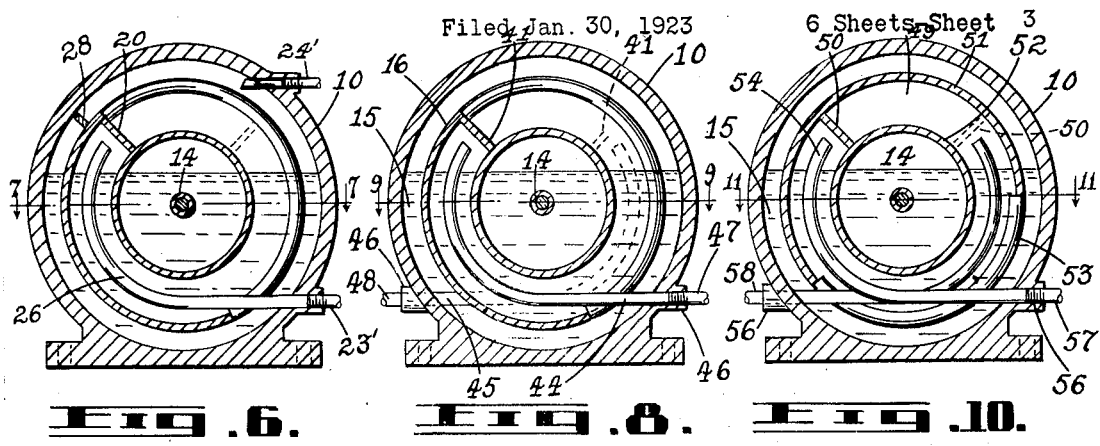

Fig. 6 is a vertical section similar to Fig. 3 and showing the device employed as a pressure gauge or flow meter.

Figures 7, 9, 11:
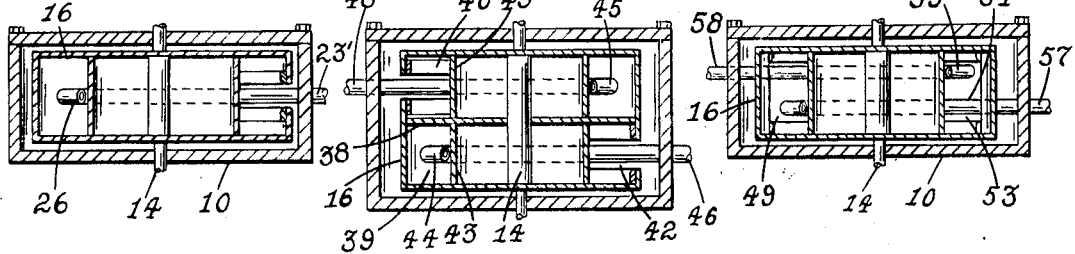

Fig. 7 is a section taken on the line 7—7 of Fig. 6.

Fig. 8 is a view similar to Figs. 3 and 6 and showing the device constructed to serve as a differential pressure gauge or flow meter.

Fig. 9 is a section taken on the line 9—9 of Fig. 8.

Fig. 10 is a view similar to Figs. 3, 6 and 8 and showing the device constructed for use as a differential pressure gauge or flow meter, the construction being a slight modification of the structure shown in Figs. 8 and 9.

Fig. 11 is a section taken on the line 11—11 of Fig. 10.

Figure 12:
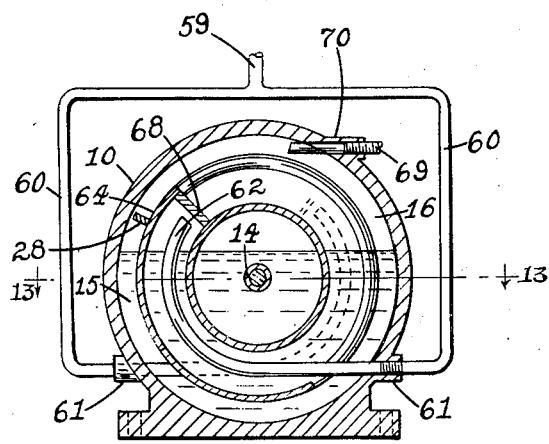

Fig. 12 is a vertical section corresponding to Figs. 3, 6, 8 and 10 and disclosing the device constructed for use as a differential pressure gauge or flow meter, the structure being a modification of the structure shown in Figs. 8 to 11, inclusive.

Figure 13:
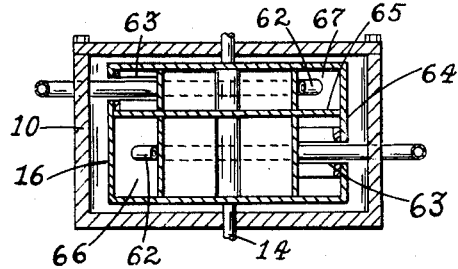

Fig. 13 is a section taken on the line 13—13 of Fig. 12.

Fig. 14 is a front elevation of a further modification of the flow meter, with the front plate of the casing removed to disclose the electrical mechanism or transformer located on and around the rotary shaft of the rotatable drum.

Fig. 15 is a vertical section through the structure shown in Fig. 14, substantially on the plane of line 15—15 of Fig. 14 looking in the direction indicated by the arrows.

Fig. 16 is an enlarged detail section showing the preferred form of binding posts carried by the casing cover and its connection with the electrical parts within the casing.

Figure 17:
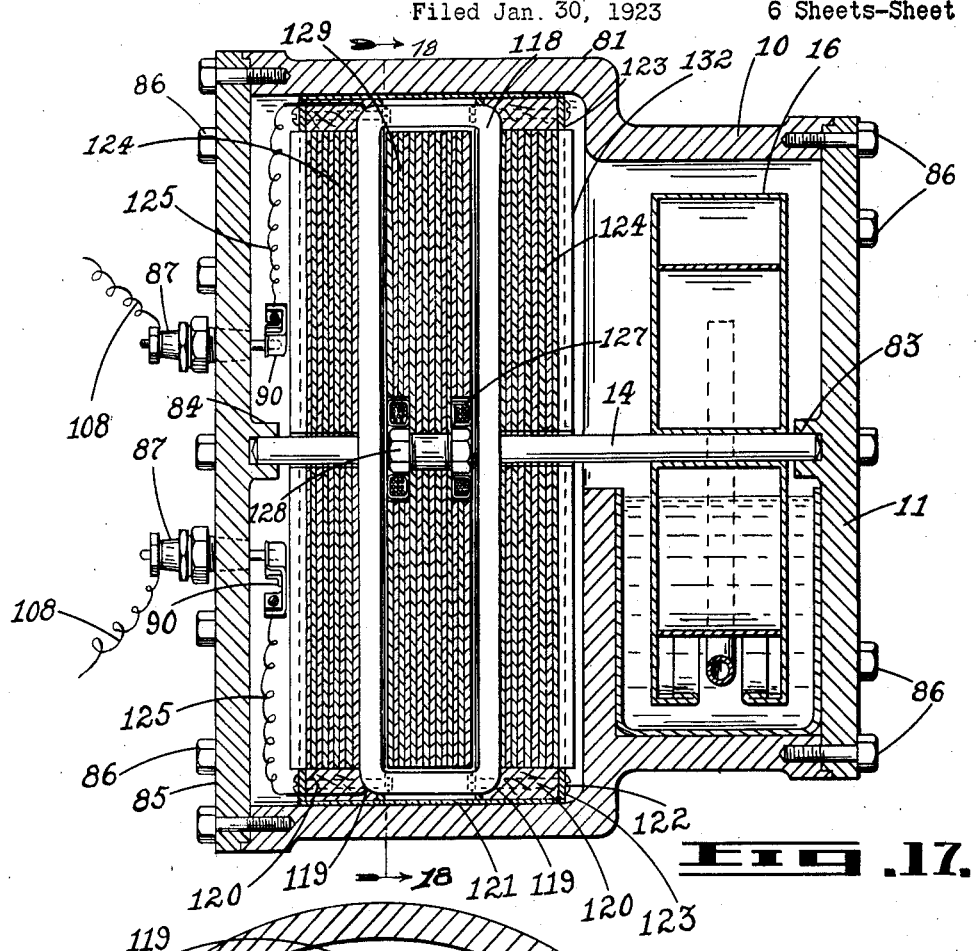

Fig. 17 is a view similar to Fig. 15 showing a modified form of transformer for the flow meter.

Figure 18:
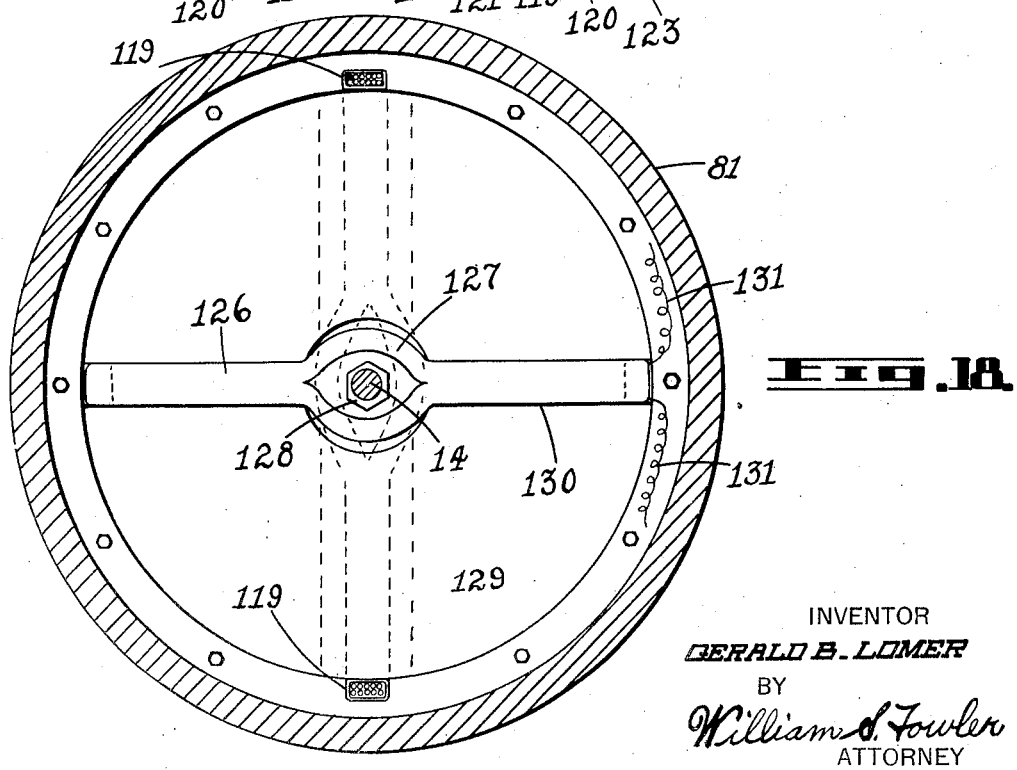

Fig. 18 is a vertical section through the structure shown in Fig. 17 and substantially on the plane of line 18—18 of Fig. 17, looking in the direction indicated by the arrows.

Figure 19:
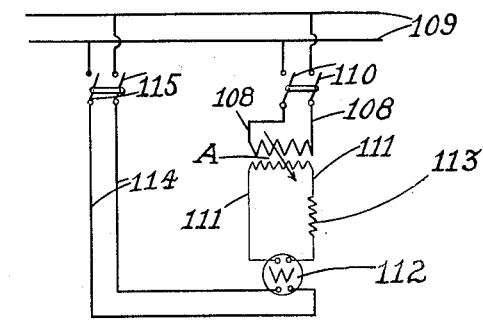

Fig. 19 is a diagrammatic view of an electric circuit within which either type of the electric flow meter may be employed, in connection with a watt meter.

Figure 20:
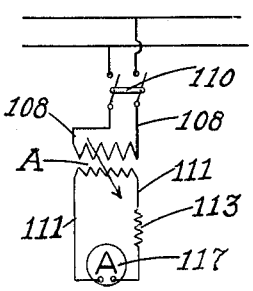

Fig. 20 is a diagrammatic view of a circuit in which may be employed either form of the electric flow meter in connection with an ammeter.

Figure 21:
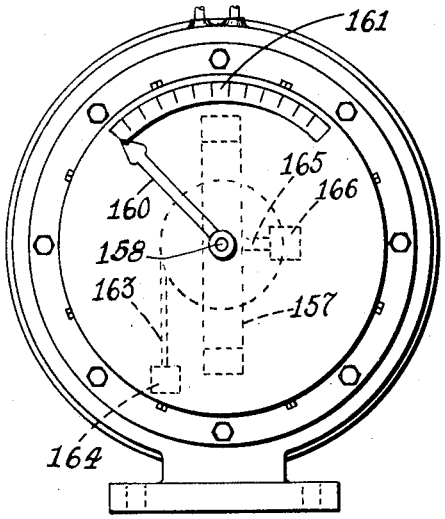

Fig. 21 is a front elevation of a further form of flow meter.

Figure 22:
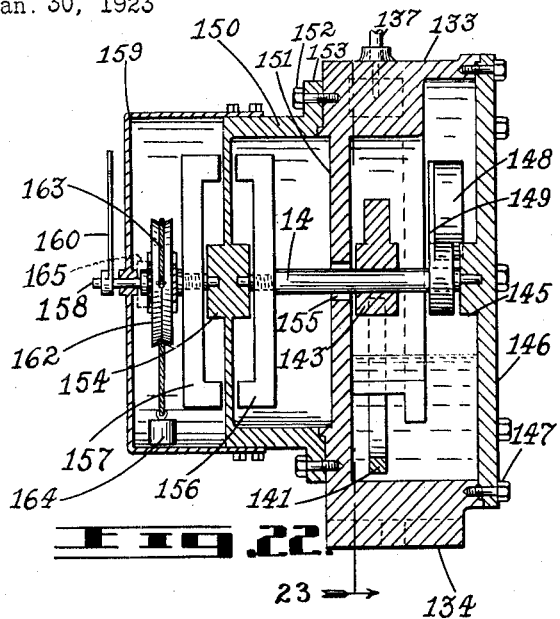

Fig. 22 is a vertical longitudinal section through the form of flow meter disclosed in Fig. 21.

Figure 23:
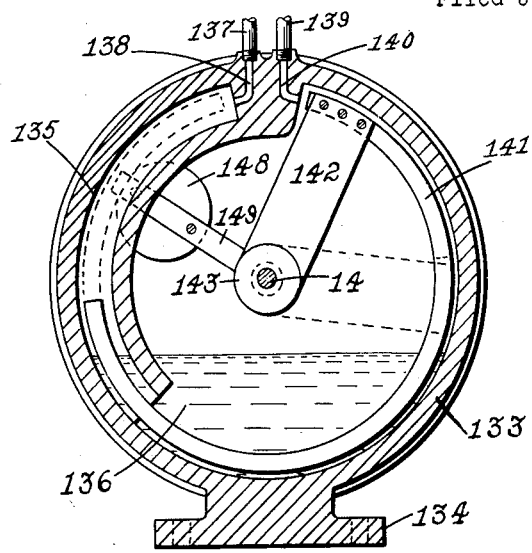

Fig. 23 is a vertical transverse section on the plane of line 23—23 of Fig. 22, looking in the direction indicated by the arrows.

Figure 24:
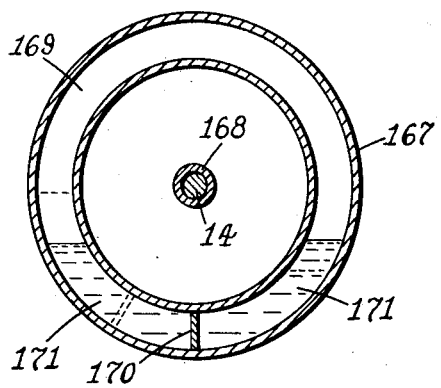

Fig. 24 is a transverse section through a modified form of counter-balancing mechanism adapted to the different forms of flow meter disclosed in this application.

Referring more in detail to the drawings in which similar reference characters designate corresponding parts throughout the several views, 10 designates a casing which is preferably of cylindrical form and has one side open, a front plate or head 11 being employed for closing said side and secured in position by the bolts 12 or other suitable means, as will be understood by referring to Fig. 2. The casing 10 is mounted on a suitable supporting base 13. A horizontal rotary shaft 14 is extended through the casing 10 transversely and mounted in the opposite sides or heads thereof, as will be apparent by referring to the drawings. The casing 10 is adapted to contain a heavy liquid 15 such as mercury to an appropriate height therein, as shown in Fig. 3.

The drum 16 which is carried for rotation with the rotatable shaft 14, within the casing 10, is partially submerged in liquid 15 and is constructed in such a manner that rotation of the drum 16 will not cause variation in the displacement of the liquid. The drum 16 has an outer circumferential wall 17 and an inner circumferential wall 18, forming therebetween a chamber 19. This chamber 19 is divided by a transverse partition wall 20 and an elongated longitudinal slot 21 is provided in the outer circumferential wall 17 for practically one half the distance around the drum and beginning at one side of the transverse partition wall 20. When forming the slot 21 the outer circumferential wall 17 is cut so that the material is turned in upon the inner face of the outer circumferential wall 17 along the opposite edges of the slot 21 to form the turned flanges 22 without waste of material and without changing the weight of the drum 16 at any point around the circumference thereof.

A lower suction pipe 23 is connected with the lower portion of the casing 10 while an upper suction pipe 24 is connected with the upper portion of the casing 10, above the lower suction pipe 23, as shown in Figs. 1, 2 and 3. Suitable sockets 25 are provided on the casing 10 to receive the lower and upper suction pipes 23 and 24. A curved lower suction pipe 26 is also secured in the lower socket 25 and extended into the casing 10, with the free end thereof curved upwardly in the far side of the casing 10. The suction pipe 26 is so positioned as to extend through the liquid 15 and upwardly from the same and also pass through the elongated longitudinal slot of the drum 16 and extend for some distance in the chamber 19. A short straight suction pipe 27 is extended from the upper socket 25 into the casing 10, above one side of the drum 16. This suction pipe 27 is adapted to be closed at times by a stop member 28 provided on the outer face of the outer circumferential wall 17 of the drum 16, when the drum 16 is in one of its extreme positions. The stop 28 also guards against undue lateral movement of the indicating pointer.

When the drum 16 is rotated with the rotatable shaft 14 to its other extended position, the transverse partition wall 20 will engage the open end of the suction pipe 26 and close the latter and also guard against undue lateral movement of the indicating pointer. The pipes 23 and 24 may be extended and secured in a fuel flow conducting pipe 29, as shown in Fig. 1 in order to permit the device to serve as a flow meter, as desired. The connecting pipe 23 with the connecting pipe 26 are arranged in this case so as to permit the pressure to operate upon one side of the transverse partition wall 20 by exhausting lighter liquid or air from the chamber 19 between the partition wall 20 and the surface of the liquid 15 in which space the curved free end of the suction pipe 26 is located, thereby causing the drum 16 to rotate with the transverse partition wall 20 moving toward the open curved end of the suction pipe 26, as indicated by dotted lines in Fig. 3.

The dynamic pressure operates through the connecting pipe 24 and extension 27, while the static pipes 26 and 23 carry off or exhaust the air gases or lighter liquid from the interior of the casing, which would have a tendency to effect or disturb a state of equilibrium.

From the foregoing, it is evident that the rotative movement of the member 16 is determined by the influence of the dynamic pressure with compensating means for static. In this manner an accurate measurement may be effected.

A pointer 30 is mounted on the extended forward end of the rotatable shaft 14 preferably between adjusting nuts 31. The offset end 32 of the pointer 30 is arranged to ride over an arcuate scale 33 provided on the face of the casing 10 over which the pointer 30 moves as the shaft 14 is rotated. Counterbalancing weights 34 are carried on a depending weight supporting arm 35 which has its upper end 36 adjustably mounted on the other extended end of the rotatable shaft 14 outwardly of the casing 10, through the medium of a set screw 37 or other suitable member.

It is apparent that the counter-balancing weights 34 will serve to properly balance the rotatable shaft 14 and the drum 16 with the pointer 30 at zero on the scale 33. Through this structure, proper operation of the rotatable shaft 14 and drum 16 will cause an accurate indication of the difference between the pressure in the pipes 23 and 24. The special construction of the drum 16 serves to assure accurate operation of the device, owing to nonvariation of displacement of the liquid 15 during rotation of the drum 16 within the casing 10 and the liquid 15 carried therein.

In Figs. 6 and 7, it will be noted that the construction of the gauge or flow meter is substantially the same as in Figs. 1, 2 and 3. the difference in the form shown in Figs. 6 and 7 being that the device is arranged for operation as a pressure gauge or flow meter, owing to the manner in which the pipe 23′ and 24′ are connected with the system on which the device is employed so that the pipe 23′ will serve as the dynamic pipe, while the pipe 24′ serves as the static pipe. Under such conditions the action on the transverse partition wall 20 is reversed and this transverse partition wall 20 is normally located opposite the open curved end of the pipe 26 as shown in full lines in Fig. 6 and adapted to be forced to the position indicated by dotted lines in this view. In this respect the construction and operation of the device as disclosed in Fig. 6 and also Fig. 7 is substantially the same as previously described in connection with Figs. 1 to 3 inclusive.

In Figs. 8 and 9 the device is shown as being constructed to serve as a differential pressure gauge or flow meter. In this form, the drum 16 is shown as being divided by a central longitudinal partition wall 38 into two equal chambers 39 and 40. Each of the chambers 39 and 40 have transverse partition walls 41 and are provided with elongated longitudinal slots 42 in the outer circumferential wall thereof and extending approximately one half the circumference of the drum 16. The drum 16 is provided with the inner circular wall 43 arranged concentrically of the rotatable shaft 14 and serving as the inner wall of each of the chambers 39 and 40. The curved pipes 44 and 45 are secured in suitable sockets 46 in opposite sides of the casing 10 and extended through the elongated slots 42 into the respective chambers 39 and 40 having their open curved ends terminating opposite the respective transverse partition walls 41. The transverse partition walls 41 in the chamber 39 normally rest adjacent the curved open end of the pipe 44 as shown in Fig. 8. The transverse partition walls 41 within the two chambers 39 and 40 are opposite and as the drum 16 is rotated say clockwise during operation of the device, one of the transverse partition walls 41 moves toward the curved open end of the pipe 45, as indicated by dotted lines in Fig. 8. Both of the pipes 44 and 45 extend upwardly through the liquid 15 to points above the level of the liquid 15 and within the respective chambers 39 and 40. Pipes 47 and 48 are extended from the sockets 46 opposite the pipes 44 and 45, respectively, and connect with suitable portions of the system with which the device is employed, the pipe 47 being connected to the higher pressure. It is apparent that the drum 16 will be rotated in the casing 10 and the liquid 15 according to the difference of the pressures within the pipes 47 and 48 so as to disclose the differential pressure on the scale 33 by movement of the pointer 30.

In Figs. 10 and 11 another form of the device is disclosed for use as a differential pressure gauge or flow meter. In this form, the drum 16 has a single chamber 49 with a transverse partition wall 50 between the outer circumferential wall 51 and the inner circular wall 52 of the drum 16. The outer circumferential wall 51 is also provided in this form of the device with an elongated longitudinal slot 53 of sufficient width to accommodate the opposed curved pipes 54 and 55, which latter have their lower ends secured in the sockets 56 in the lower portion of the casing 10 and at opposite sides thereof. The opposed pipes 54 and 55 are crossed within the chamber 49 and curved upwardly in opposite sides of the same, as shown clearly in Fig. 10, to points above the surface of the liquid 15. The pipes 57 and 58 are extended outwardly from the sockets 56 and communicate respectively with the opposed pipes 54 and 55. The pipes 57 and 58 may be connected with any suitable portions of the system on which the device is to be employed. The pipe 54 being connected with the higher pressure, so that the difference of pressure in the pipes 57 and 58 and the pipes 54 and 55 connected therewith will act upon opposite sides or faces of the transverse partition 50 to rotate the drum 16 and the rotatable horizontal shaft 14, according to the difference of the two pressures, thereby determining the differential pressure. This differential pressure may be readily determined by movement of the pointer 30 carried on the shaft 14 over the scale 33, the same as in the other forms of the invention. It is to be understood that the material cut out from the outer circumferential wall 51 in forming the slot 53 is turned back along the edges of the slot 53 to maintain an even weight for the drum 16 around the entire circumference thereof and thereby assure proper balancing of the drum 16 at all times without uneven displacement of the liquid 15 during rotation of the drum 16 of the liquid. If desired, additional material may be located either on the side or the circumference of the drum 16, instead of turning back the material along the slot 53, as stated.

In Figs. 12 and 13 a further modification is disclosed and which includes a pipe 59 which when the device is used as a flow meter, may be termed the dynamic pressure pipe and is divided to form the branches 60 having their ends secured in the sockets 61 in the lower portion of the casing 10 and on opposite sides thereof. The opposed pipes 62 are also secured in the sockets 61 and crossed as they extend into the casing 10 and through the elongated longitudinal slots 63 in the circumferential outer wall 64 of the drum 16.

In this form of the device, a longitudinal partition 65 is provided in the drum 16 to divide the same into a comparatively large chamber 66 and a comparatively small chamber 67 as shown clearly in Fig. 13. The sockets 61 are offset from one another and the pipes 62 extend upwardly in opposite sides of the chambers 66 and 67, the free ends of the pipes 62 being curved upwardly, as shown in Fig. 12. The transverse partition walls 68 are provided in the chambers 66 and 67 and arranged opposite one another. It is also to be noted that the free open ends of the pipes 62 project above the surface of the liquid 15 so that the discharge from the pipes 62 may operate properly against the opposite faces of the transverse partition wall 68, as will be clearly understood. Another pipe 69 which may be termed the static pressure pipe is secured in the socket 70 provided in the upper portion of the casing 10, as shown in Fig. 12. The pipe 69 is arranged so as to permit the static pressure entering the casing 10 to exert an equal pressure on the entire exterior of the drum 16 above the liquid 15.

The drum 16 is constructed so that the transverse partition 68 within the comparatively large chamber 66 has a larger area than the transverse partition 68 in the comparatively small chamber 67. For instance, the comparatively large chamber 66 may have an area of three square inches while the chamber 67 has an area of two and three quarter square inches, thereby giving a difference of one fourth of a square inch in the two chambers. This means that the drum 16 in this form is constructed for registering very small variations in pressure or suction and the same result is obtained as though a single chamber was formed in the drum 16 with an area of one quarter of a square inch, if it were possible to construct such a small and sensitive device with a single pipe extended into the drum 16.

It may be stated at this time that the drum 16 in several of the forms so far disclosed carries the stop member 28 on its outer face for closing at times the pipe extended into the upper portion of the casing 10 when such a pipe is employed. In this connection reference is made to Figs. 1, 2, 3, 6, 7, 12, and 13.

In Fig. 4 a modified form of counter-balancing means is disclosed and this consists of a depending weight 71 which is carried on a cable 72 having its upper end extended around a pulley 73 and secured thereto, the pulley 73 being rigidly mounted on an extended end of the rotatable shaft 14. A second weight 74 is carried on the outer end of the arm 75 extended horizontally from the same end of the rotatable shaft 14 and secured in adjusted position thereon by a set screw 76 or other suitable means. The pointer 30 is carried on the other extended end of the rotatable shaft 14 for movement over the scale 33, as in the other forms disclosed. It is apparent that the weights 71 and 74 counter-balance one another when in normal position as disclosed in the drawings with the pointer 30 at zero on the scale 33 and at which time the drum 16 is in normal or unoperated position. As the drum 16 rotates under the influence of the pressure or suction, the weight 71 is drawn up and the weight 74 swings downwardly in its arc of movement and the pointer 30 moves across the scale 33. During this operation, the resistance to the rotation of the member 16 and associated parts, increases in proportion to the increased forces of pressure on the member 16. The weight members 71 and 74 act against an increase in force or pressure, thus retarding the movement of the drum 16.

In this manner, it is possible to effect an equalized movement of the indicator member, and thereby permit the indicating marks on the measuring scale to be equalized as to measurements, doing away with gradually crowding or jamming the scale markings as has heretofore been the practice in marking devices of this character.

In order to assure absolutely accurate counterbalancing of the pressure operated member at all times as the indicating member moves over the scale, it may be necessary to alter slightly the periphery of the pulley 73, as for example, by providing thereon the cam projection 73' which will serve to throw out gradually to one side the weights 71 during raising thereof. If necessary to throw the weights in gradually, the periphery of the pulley 73 could be readily altered for this purpose. It is also apparent that the pulley 73 may be mounted eccentrically of the rotatable shaft 14 to throw the weights 71 out or in gradually during raising thereof. If desired, however, the same result may be accomplished in some other suitable manner.

In Fig. 5 a modification of the counter-balancing means is disclosed and this includes the weight 74 carried on the arm 75 adjustably mounted on an extended end of the rotatable shaft 14 by a set screw 76 or the like, as in the form disclosed in Fig. 4. In the form disclosed in Fig. 5, however, the lift weight 71 is dispensed with and in place thereof the helical spring 77 is employed, the small end thereof being secured to the rotatable shaft 14 while the coils of the helical spring 77 are extended around the rotatable shaft 14 and the outer end 78 of the helical spring 77 secured on the wall of the casing 10. The helical spring 77 is positioned in such a manner as to counter-balance or support the weight 74 in its horizontal or normal position when the pointer 30 indicates zero. As the pointer 30 moves over the scale 33 owning to rotation of the drum 16 under influence of the pressure or suction operating the same, the arm 75 with the weight 74 will swing downwardly in its arc of movement toward its extended or lowermost position, as indicated by dotted lines, and which extended or lowermost position it may occupy when the pointer 30 is at the highest point on the scale 33, as also indicated by dotted lines in Fig. 5. During the downward swinging movement of the arm 75 and weight 74, the tension of the spring 77 is increased and the spring remains under increased tension as long as the arm 75 and weight 74 are in any position below their normal horizontal position.

Fig. 5^A discloses a further modification of counter-balancing means and it will be seen by referring to this view that in this form a helical spring 79 is employed without any weights. The inner end of the helical spring 79 is secured on an extended end of the rotatable shaft 14 and the coils of the helical spring 79 enclose the rotatable shaft 14 while the outer end 80 of the helical spring 79 is secured on the wall of the casing 10. The helical spring 79 will offer resistance to the rotation of the drum 16 and rotatable shaft 14 under influence of the pressure or suction operating upon the drum 16 and the resistance offered by the helical spring 79 will increase as the pointer 30 moves from the zero end of the scale 33 toward the other end. This gives even graduation when used as draft gauge. When used as velocity flow meter, the scale is shown in Fig. 5^A with the graduations at the first or lower end of the scale closer together and the graduations gradually widening toward the other end of the scale 33.

In Figs. 14, 15 and 16, a modification of the invention is disclosed. In this form an auxiliary casing 81 is provided at one side of the casing 10 and preferably formed as a part thereof. The upper portion of the auxiliary casing 81 has communication with the upper portion of the casing 10, as shown in Fig. 15 and a tray 82 is provided in the lower portion of the casing 10 to contain the liquid 15. One end of the rotatable shaft 14 for the drum 16 within the casing 10 is supported by a bearing 83 carried centrally on the inner face of the removable head 11 at the outer side of the casing 10. The shaft 14 is extended centrally through the auxiliary casing 81 and has its remaining end mounted in a suitable bearing 84 carried centrally on the inner face of the removable head 85 for the outer side of the auxiliary casing 81. The removable head 85 may be secured in position by the bolts 86 or other suitable means and carries at its opposite sides pairs of binding posts 87, including insulating body portions 88 threaded through the head 85, as shown clearly in Fig. 16. The central rods of the binding posts 87 have their inner ends extended for removable engagement in the turned clamping ends 89 of the spring contact plates 90. The other turned ends 91 of the spring contact plates 90 are secured between the insulating washers 92 on the screws 93 extending into the side or circumferential wall of the auxiliary casing 81. This also may be clearly understood by referring to Fig. 16.

Secured within the auxiliary casing 81 are the spaced insulating plates 94, through the centre of which the rotatable shaft 14 extends for free rotation. Positioned against the inner faces of the insulating plates 94 and spaced from one another, are the insulating rings 95 formed of wood or other suitable material. Held between the insulating rings 95 are a pair of iron rings 96 with a plurality of iron rings 97 clamped therebetween and having their outer circumferential edges together with the corresponding edges of the iron rings 96 resting on an enclosing insulating ring 98 fitting against the inner face of the circumferential wall of the auxiliary casing 81, as clearly shown in Fig. 15. The iron rings 96 and 97 constitute the laminated outer or primary core of the magnetic circuit. The primary coil 99 extends through suitable slots 100 provided for this purpose through the insulating plates 94 and also through the iron rings 96 and 97. It will be seen by referring to Fig. 14 that the primary coil 99 has bifurcated vertical portions on the outer faces of the insulating plates 94 to straddle the rotatable shaft 14. It will also be seen from this view that the primary coil 99 is stationary and connected at its upper and lower portions with the pair of spring contact plates 90 at one side of the auxiliary casing 81 by connecting wires 101.

The secondary coil 102 is normally in a horizontal plane and is provided with bifurcated portions on the outer faces of the iron disks 103 of the laminated inner or secondary core to straddle the rotatable shaft 14, as shown clearly in Figs. 14 and 15. The bifurcated portions of the secondary coil 102 also straddle the nuts 104 threaded on the rotatable shaft 14 and bearing against the outer face of the iron disks 103. A plurality of iron disks 105 are clamped on the rotatable shaft 14 between the iron disks 103. It is to be understood that the iron disks 103 and the iron disks 105 constitute the laminated inner or secondary core 105' of the magnetic circuit. The secondary coil 102 extends through the slots 106 provided for this purpose in the opposite side edges of the iron disks 103 and 105, as shown in Fig. 14. It is to be seen from Figs. 14 and 15 that the secondary core for the secondary coil 102 has an air gap between it and the primary core of the magnetic circuit. It is apparent that the rotatable and laminated secondary core 105' of the magnetic circuit rotates with the secondary coil 102 and with the rotatable shaft 14 when the drum 16 is rotated. Suitable connecting wires 107 are extended from the secondary coil 102 to the pair of spring contact plates 90 located at the side of the auxiliary casing 81 opposite the side carrying the spring contact plates having the wires 101 connected therewith from the primary coil 99.

Current conducting wires 108 are extended from the first mentioned pair of binding posts 87 and connected with main line wires 109, a suitable switch 110 being located in this circuit. Current conducting wires 111 are extended from the second mentioned pair of binding posts 87 and connected with the current coil of a watt meter 112, a fixed resistance coil 113 being located in this circuit. The potential coil of the watt meter 112 is connected with the main line wires 109 by suitable connecting wires 114 having switch members 115 arranged in their paths. The entire device forming the subject matter of this invention and including the adjustable transformer is designated at A in Fig. 19 and also in Fig. 20, which latter figure will be referred to more in detail as the description proceeds.

Operation of the drum 16 together with the rotary shaft 14, under influence of the pressure or suction acting upon the drum 16 and which may be termed a mechanical force, will result in the secondary coil being moved from its normal or horizontal position, according to the rotation of the rotatable shaft 14. As the secondary coil 102 moves from its horizontal position toward a vertical position some of the lines of force set up by the current in primary coil 99 will thread through the secondary coil, thereby setting up a secondary current in the secondary coil 102. It is also to be noted that arcuate bars 116 are positioned in opposite sides of the auxiliary casing 81 to compensate for the material cut out of the core for the primary coil 99. This also serves to increase the accuracy of operation of the complete device.

In the diagram shown in Fig. 20 it will be seen that an ammeter 117 may be employed in place of the watt meter 112 and the current conducting wires 11 connected with the ammeter 117 in a suitable manner. The fixed resistance coil 113 should be employed in the path of one of the current conducting wires 111 when the ammeter 117 is employed the same as when the watt meter 112 is employed. In either case the readings will be in terms of the quantities being metered. The construction and operation of the parts of the invention disclosed in Figs. 1 to 18 inclusive will be the same, however, no matter whether the watt meter 112 is employed or the ammeter 117 for the readings of the flow meter or gauge through the use of the adjustable transformer disclosed in Figs. 14 and 15 or the type of adjustable transformer disclosed in Figs. 17 and 18. The special manner of connecting up the watt meter with the adjustable transformer serves to compensate for faulty line voltage, and thereby assure accurate registration of the steam flow metered.

The adjustable transformer disclosed in Figs. 17 and 18 includes a primary coil 118 which extends practically the full height of the auxiliary casing 81 and is seated at its upper and lower ends in recesses 119 provided for this purpose in the inner edges of the spaced insulating rings 120 composed of wood or other suitable material. The spaced insulating rings 120 are secured in opposite portions of the insulating ring 121 contacting with the inner face of the circumferential wall of the auxiliary casing 81. Suitable bolts 122 or other members are extended through the insulating disks 123 and through the spaced insulating rings 120, as shown clearly in Figs. 17. It is, therefore, apparent that the spaced insulating rings 120 will be securely held in proper position within the ring 121. The laminated primary core for the primary coil 118 is formed in spaced sections each composed of a plurality of iron disks or plates 124 secured in the spaced insulating rings 120 on opposite sides of the primary coil 118. This may be readily seen by referring to Fig. 17. Furthermore, the current conducting wires 125 are extended from the primary coil 118 to the spring contact plates 90 which are in turn connected with the pair of binding posts 87 having the current conducting wires 108 extended therefrom at one side of the auxiliary casing 81. The primary coil 118 is bifurcated between its upper and lower ends to avoid and straddle the rotatable shaft 14 extended therethrough and through the primary core 124.

In the type of the device disclosed in Figs. 17 and 18 the auxiliary casing 81 corresponds with the auxiliary casing 81 disclosed in Figs. 14, 15 and 16 and has a removable head 85 at the forward side thereof carrying the binding posts 87 and secured in position by suitable bolts 86, as described in connection with Figs. 14 to 16 inclusive. The rotatable shaft 14 has its opposite ends mounted in the bearings 83 and 84, as previously described and therefore extends through the auxiliary casing 81 as well as the main casing 10.

Enclosed by the primary coil 118 is the movable secondary coil 126 which has a bifurcated central portion 127 to straddle the rotatable shaft 14 and nuts 128 threaded on the rotatable shaft 14. The laminated secondary core 129 for the movable secondary coil 126 comprises a plurality of iron plates or disks which are rigidly mounted on the rotatable shaft 14 for rotation therewith and with the movable secondary coil 126 and held in position by the nuts 128. Recesses or pockets 130 are provided in the outer iron disks of the laminated secondary core 129 to accommodate the secondary coil 126 and nuts 128. The recesses or pockets 130 are also continued through the opposite edges of all of the iron disks or of the laminated secondary core 129 to accommodate the opposite ends or poles of the secondary coil 126, as shown in Fig. 18. It is also to be seen from Figs. 17 and 18 that the iron disks or plates of the laminated secondary core 129 are of proper size to avoid the primary coil 118 and thereby permit the secondary coil 126 and the laminated secondary core 129 to revolve in either direction within the primary coil 118 and the stationary primary core 124 for the latter as the rotatable shaft 14 is rotated. The current conducting wires 131 are extended from the secondary coil 126 at one end or pole thereof and connected in a suitable manner to the other pair or second pair of resilient contact plates 90 carried in the auxiliary casing 81 and having connection with the pair of binding posts 87 from which are extended the current conducting wires 111. The magnetic balance is restored by the addition of the iron strips 132 in parallel relation to the slots in the iron disks or plates 129.

It is to be understood that the type of device disclosed in Figs. 17 and 18 operates in the same manner as the type disclosed in Figs. 14 to 16 inclusive and is connected electrically with the main line wires in the same manner as the first type including the adjustable transformer and as outlined in the diagrammatic views (Figs. 19 and 20).

When the electrical transformer is employed in building up the flow meter, the action of the transformer is reversed to the action of the ordinary watt meter, due to the fact that the current in the secondary coil of the transformer is induced by the field set up by the primary coil of the transformer. The tendency is for this secondary coil to take up a position at right angles to the primary. The potential coil of the watt meter is connected across the supply lines of the main circuit in connecting up the parts disclosed in Figs. 14 to 20, inclusive. The primary coil of the transformer also is connected with the supply lines. The secondary coil of the transformer is connected with the current coil of the watt meter. However, the potential coil of the watt meter is not connected across the secondary circuit but is connected across the primary circuit or supply lines. The result is that for a given torque transmitted from the pressure operated member of the flow meter to the secondary coil and movable core of the transformer is always counter-balanced by the same predetermined number of watts, even when the line voltage varies.

In the case of the ammeter, variations of line voltage would cause a variation in the reading of the ammeter for the same torque. For example, if the line voltage decreases, the current flowing in the secondary coil and ammeter would increase in order that the electrical torque may continue to balance the mechanical torque. In the use of the watt meter, however, the increase of the secondary current is exactly counter-balanced by the decreased current in the potential coil.

By referring to Figs. 19 and 20 it will be seen that the adjustable transformer disclosed in Figs. 14 to 16 inclusive may be readily employed with either a watt meter or ammeter to register the steam flow or pressure. The same is true of the form of the device disclosed in Figs. 17 and 18 and showing a modified form of adjustable transformer. Attention may be directed at this time to the fact that when connecting either form of the adjustable transformer with a watt meter, the electrical connections with the watt meter are not made in the usual manner, but as stated above. It is believed the electrical form of the flow meter may now be clearly understood and the proper manner of connecting the same with either a watt meter or an ammeter. Therefore, further detailed description of the construction, operation and installation of the electric flow meter disclosed in this application is unnecessary.

In Figs. 21 to 23 inclusive a further modified form of flow meter is disclosed and which includes a main casing 133 which is of cylindrical form and mounted on a suitable base 134. The thickness of a portion of the circumferential wall of the main casing 133 is increased at one side of the main casing 133, as shown in Figs. 22 and 23 and an arcuate channel 135 is provided in this thickened portion with its lower end opening into the main chamber of the main casing 133 at a point below the level of the mercury or other liquid 136 carried in the main chamber of the main casing 133. The static pipe 137 is secured in the upper portion of the main casing 133 and connects with the narrow passage 138 opening into the upper end of the arcuate channel 135. The dynamic pipe 139 is also mounted in the upper portion of the main casing 133 and connected with the narrow passage 140 opening into the main chamber of the main casing 133. This may be readily understood by referring to Fig. 23.

A solid arcuate bar 141 is positioned in the main casing 133 with the greater part thereof located in the main chamber of the main casing 133 and having one end secured to the outer end of the supporting arm 142. The inner end of the supporting arm 142 has a hub or bearing portion 143 secured rigidly on the central shaft 14 mounted for rotation within the main casing 133. A bearing 145 is provided centrally on the inner face of the removable head 146 for the main casing 133. One reduced end of the central shaft 14 engages in the bearing 145 and the removable head 146 may be readily secured in position by the bolts 147 or other suitable means. The free end of the solid arcuate bar 141 extends into the arcuate channel 135 from the open lower end thereof and terminates at a point above the level of the mercury or other liquid 136 entering the lower end of the arcuate chamber 135 from the main chamber of the main casing 133. It will also be evident that the lower portion of the solid arcuate bar 141 rides through the mercury or other liquid 136 without displacement of the latter and the free end of the solid arcuate bar 141 moves longitudinally of the arcuate chamber 135 as indicated by dotted lines according to the difference of the pressure within the arcuate channel 135 and the main chamber of the main casing 133. Sensitive and accurate operation of the solid arcuate bar 141 is assured by the position of the narrow passages 138 and 140, preferably the latter opening into the main chamber of the main casing 133 directly opposite the end of the solid arcuate bar 141 attached to the arm 142. This will be clear from reference to Fig. 23.

It will also be seen in this view that the portion of material cut away from between the ends of the solid arcuate bar 141 is compensated for by the counter-balancing weight 148 carried on the weight supporting arm 149 projecting radially from the central shaft 14. The counter-balancing weight 148 works within the main chamber of the main casing 133 above the mercury or other liquid 136 and the weight supporting arm 149 extends at substantially right angles of the supporting arm 142 and must be raised as the supporting arm swings to its lowermost position as indicated by dotted lines in Fig. 23, during movement of the free end of the solid arcuate bar 141 upwardly within the arcuate channel 135.

A brass cap or casing 150 is mounted on the closed head 151 of the main casing 133 by suitable securing members 152 extended through the annular flange 153 of the brass cap or casing 150. The brass cap or casing 150 has a central enlargement 154, which serves as a bearing. One reduced end of the central shaft 14 rotates in an aperture in one side thereof, after the central shaft 14 is extended through the opening 155 provided for this purpose in the closed head 151 of the main casing 133. A horse shoe magnet 156 is threaded on the last mentioned reduced end of the central shaft 14, within the brass cap or casing 150. A second horse shoe magnet 157 is threaded on the indicator shaft 158 which is in alignment with the central shaft 14. The horse shoe magnet 157 is within the outer cap 159 secured on the brass cap or casing 150 and the horse shoe magnet 157 is opposed to the horse shoe magnet 156 with both of the horse shoe magnets 156 and 157 spaced slightly from opposite faces of the main part of the brass cap or casing 150, as shown clearly in Fig. 22. It will also be noted from this view that one end of the indicator shaft 158 is rotatably mounted in an aperture in the adjacent side of the enlargement or bearing 154. The shaft 158 extends through and rotates in the outer cap 159 and carries the pointer 160 on its outer extremity to ride over the arcuate scale 161 provided on the outer face of the outer cap 159, as shown in Fig. 21. This scale 161 is shown as having its graduation marks equally spaced throughout its length although any other type of scale may be substituted as desired, according to the service for which the flow meter is employed.

In order to retard rotation of the shaft 158 on the influence of the horse shoe magnet 157 following the horse shoe magnet 156 when the shaft 14 rotates, counter-balancing means is provided on the shaft 158. This counter-balancing means includes a pulley 162 carried rigidly on the shaft 158 and having attached to the periphery of the pulley 162, a cable 163 with a weight 164 suspended thereby from one side of the pulley as shown in Figs. 21 and 22. It will also be seen in Fig. 21 that the counter-balancing means for the shaft 158 further includes a radially directed arm 165 carried by the shaft 158 extending normally in a horizontal plane with the weight 166 supported thereon. It will be apparent that the weights 164 and 166 operate against one another and co-operate to normally retain the shaft 158 in its initial position with the pointer 160 at zero on the arcuate scale 161, rotation of the shaft 158 from this position being compelled by the horse shoe magnet 157 following the horse shoe magnet 156 when the latter is moved out of its normal position.

In Fig. 24 is disclosed a modified form of counter-balancing means which may be employed in connection with any one of the various forms of the device in place of the counter-balancing means disclosed for the respective forms. This counter-balancing means consists of an auxiliary drum 167 having a hub portion 168 for rigid mounting on the rotatable shaft 14. An annular chamber 169 is provided around the edge of the auxiliary drum 167 with a transverse partition 170 in its lowermost portion. Mercury or other suitable liquid 171 is provided in the annular chamber 169 and distributed equally on opposite sides on the transverse partition 170. This results in normally retaining the auxiliary drum 167 in one position and preventing rotation of the shaft 14 unless sufficiently influenced by a change in pressure operating oppositely on the mercury provided on the main rotatable shaft 14. When the rotatable shaft 14 rotates in one direction, the auxiliary drum 167 will move as indicated by dotted lines in Fig. 24 with the mercury 171 on one side of the transverse partition 170 being raised by the latter while the level of the mercury 171 on the other side of the transverse partition 170 lowers, thereby placing more weight on the raised side of the auxiliary drum 167 to assist in returning the auxiliary drum 167 and all other parts carried on the rotatable shaft 14 to a normal position as the action of the opposed pressures on the mechanism carried on the rotatable shaft 14 is reversed.

Although several different forms of the device are shown, it will be apparent to any one familiar with the art that every form is but a variation of structure of the same invention. It is believed the complete construction and variation may now be clearly understood and all the various uses and applications of the device in different systems or parts of systems readily appreciated by those versed in this art, from a careful reading of the foregoing paragraphs taken in connection with the accompanying drawings without further detailed description. The principal uses and operations of the various forms may be briefly stated, however, as follows.

The form as disclosed in Figs. 1 to 3 inclusive, may be connected with the flow pipe 29 of any steam system, hot air system or the like. When employed for this purpose, the scale disclosed in Fig. 1 should be employed and the device may be termed a suction gauge or flow meter. During operation of the device for this purpose, the drum 16 will be rotated in a clockwise direction. The counter-balancing means shown in Fig. 2 may be employed or any other appropriate form of the counter-balancing means disclosed in the application substituted therefor, or any variation of appropriate type of the counter-balancing means, if preferred. It is also evident that the device may be connected with a different portion or portions of any system to which it is adapted, in a different manner from that illustrated in Fig. 1, with very little if any variation in the construction and operation of the device.

As illustrated in Figs. 6 and 7, the device is adapted for use as a pressure gauge and the operation of the drum 16 is the reverse to the operation of the drum 16 in the first form, although the drum 16 may be rotated in the same direction in each form. It is also to be noted that when the form of the device disclosed in Figs. 6 and 7 is used as an ordinary draft gauge the pressure pipe 24' is open free to the atmosphere.

When the device is to be used as a differential pressure gauge or flow meter, the parts may be constructed and arranged as disclosed in Figs. 8 and 9. In this form, two chambers of equal capacity are provided in the drum 16 and the pressure pipes 47 and 48 extending into the separate chambers may be appropriately connected with parts of the system on which the gauge or flow meter is to be employed.

A different form of differential pressure gauge or flow meter, as shown in Figs. 10 and 11, with a pair of opposed pressure pipes 57 and 58 extending into a single chamber in the drum 16 may be employed in place of the differential pressure gauge or flow meter disclosed in Figs. 8 and 9.

When an extremely sensitive device is required for registering very slight variations of differential pressure, the device may be constructed as disclosed in Figs. 12 and 13 and connected in an appropriate manner to the system.

It will be noted that the counter-balancing means for the rotatable shaft 14 carrying the drum 16 is not disclosed in Figs. 6 to 13 inclusive. This feature is omitted from such views for the reason that either of the types of mechanical counter-balancing means disclosed in Figs. 2, 4, 5, 5A and 24 may be employed as part of the device in any of its forms disclosed.

The electrically controlled counter-balancing means disclosed in Figs. 14 to 16 inclusive, and the type disclosed in Figs. 17 and 18 are both shown in connection with one of the simple forms of gauge or flow meters included in this application and may be substituted for one another in such a form of the device or in any other form thereof, in place of the mechanical counter-balancing means. The same is true of the counter-balancing means disclosed in Figs. 21 to 23 inclusive and which type of counter-balancing means includes the opposed horse shoe magnets 156 and 157. The different types of scales disclosed in the application may be properly selected for use in any one of the complete gauges or flow meters disclosed herein, according to the particular use for which the gauge or flow meter is designed. This is not only desirable, but necessary owing to the unlimited applications of gauges and flow meters in the different private and public steam systems, air systems and the like and the various manners in which the gauges and flow meters may be connected with such systems. As all of the features of construction, application and operation of the gauge and flow meters should now be clear from the foregoing description together with the drawings, it is believed that further statements are unnecessary.

While the preferred embodiment of the invention has been disclosed, it is to be understood that minor changes in the details of construction, combination and arrangement of co-operating elements may be resorted to within the scope of what is claimed without departing from the spirit of the invention.

What I claim as new is:

1. A gauge and flow meter comprising a casing, a rotatable shaft mounted in the casing, a pressure operated member mounted on the shaft and provided with an internal partition forming pockets therein, a sealing liquid in the casing closing the said pockets, counter balancing means for the pressure operated member mounted on the shaft, indicating means on the casing, operative connections between the indicating means and shaft, circumferentially disposed arcuate openings formed in the pressure operated member adapted to receive conducting pipes and means including said pockets for subjecting the pressure member to dynamic and static pressures.

2. A gauge and flow meter comprising a casing, a rotatable shaft mounted in the casing, a pressure operated member formed with a hollow peripheral wall mounted on the shaft, electrical counter balancing means for the pressure operated member mounted on the shaft, an indicating contrivance designed to indicate the magnitude of the force acting on the member operated by the shaft, pipe connections to the casing designed to transmit to the pressure member, the dynamic and static pressures, and arcuate openings formed on the periphery of the pressure member, adapted to straddle the pipe connections and permit their extension within the hollow peripheral wall.

3. A gauge and flow meter comprising a casing, a rotatable shaft mounted in the casing, a pressure operated member mounted on the shaft forming a pocket, a sealing liquid in the casing closing the pocket, electrical counter balancing means for the pressure operated member, indicating means on the casing, operative connections between the indicating means and shaft, and pipe connections to the casing and pocket.

4. A gauge and flow meter claimed in claim 3, in which a projection is provided on the pressure operated member, designed to close the static pipe on rotation of the pressure member through a certain angle.

5. A gauge and flow meter comprising a casing, a rotatable shaft mounted in the casing, a pressure operated member mounted on the shaft formed with exposed peripheral arcuate openings, a partition in the member forming two pockets, a sealing liquid in the casing separating the two pockets from each other and from the casing, counter balancing means for the pressure operated chamber, indicating means on the casing operatively connected to the shaft, a static pipe connection from the flow pipe of a system extending within one pocket, and a dynamic pipe connection from the flow pipe extending within the other pocket, whereby the indicating means are actuated by the resultant pressure.

6. The gauge and flow meter claimed in claim 5, in which the pressure operated member is adapted to move through the liquid without variation of displacement of the latter.

7. The gauge and flow meter claimed in claim 5, in which the pressure operated member is adapted to move through the liquid without variation of displacement of the latter.

In testimony whereof, I affix my signature.

GERALD B. LOMER.